United States Patent
Shubs, Jr. et al.

(10) Patent No.: US 9,694,834 B2
(45) Date of Patent: Jul. 4, 2017

(54) MACHINE ASSET MANAGEMENT SYSTEM HAVING USER INTERFACE

(71) Applicant: Electro-Motive Diesel, Inc., LaGrange, IL (US)

(72) Inventors: Alexander Shubs, Jr., Chicago, IL (US); David Roenspies, Elburn, IL (US); James D. Seaton, Westmont, IL (US)

(73) Assignee: Elecro-Motive Diesel, Inc., LaGrange, IL (US)

( * ) Notice: Subject to any disclaimer, the term of this patent is extended or adjusted under 35 U.S.C. 154(b) by 0 days.

(21) Appl. No.: 14/887,250

(22) Filed: Oct. 19, 2015

(65) Prior Publication Data

US 2017/0106883 A1    Apr. 20, 2017

(51) Int. Cl.
| | |
|---|---|
| *G05B 23/02* | (2006.01) |
| *B61L 15/00* | (2006.01) |
| *G06F 3/0482* | (2013.01) |
| *G06F 3/0484* | (2013.01) |
| *G06F 3/0485* | (2013.01) |

(52) U.S. Cl.
CPC ......... *B61L 15/009* (2013.01); *B61L 15/0018* (2013.01); *G06F 3/0482* (2013.01); *G06F 3/0485* (2013.01); *G06F 3/04842* (2013.01)

(58) Field of Classification Search
CPC .......... G05B 23/02; G06Q 10/06; G06F 19/00
See application file for complete search history.

(56) References Cited

U.S. PATENT DOCUMENTS

| | | |
|---|---|---|
| 6,324,659 B1 | 11/2001 | Pierro |
| 6,757,521 B1 | 6/2004 | Ying |
| 7,233,844 B2 | 6/2007 | Peltz et al. |
| 7,392,097 B2 * | 6/2008 | Schweizer ............... A63G 7/00 |
| | | 700/17 |
| 7,783,507 B2 | 8/2010 | Schick et al. |
| 7,793,850 B1 | 9/2010 | Ho et al. |
| 8,082,076 B2 | 12/2011 | Sells et al. |
| 8,386,281 B2 | 2/2013 | Goodermuth et al. |
| 8,386,962 B2 | 2/2013 | Geesey |
| 8,589,256 B2 | 11/2013 | Tays et al. |

(Continued)

FOREIGN PATENT DOCUMENTS

WO    WO 2004/013731 A2    2/2004

*Primary Examiner* — Thomas Tarcza
*Assistant Examiner* — Alex C Dunn
(74) *Attorney, Agent, or Firm* — Finnegan, Henderson, Farabow, Garrett & Dunner, LLP

(57) ABSTRACT

An asset management system for a machine is disclosed. The asset management system may include a sensor associated with an asset of the machine and configured to generate a signal indicative of an operational status of a system associated with the asset. The asset management system may further include a user interface associated with the machine and a controller in communication with the sensor and the user interface. The controller may be configured to display on the user interface a graphical representation of the asset, receive via the user interface a user selection of the system from a plurality of systems associated with the asset, and display on the graphical representation of the asset a visual indicator of the system in response to the user selection. The visual indicator of the system may indicative of the operational status of the system.

18 Claims, 7 Drawing Sheets

(56) References Cited

U.S. PATENT DOCUMENTS

| | | | |
|---|---|---|---|
| 2007/0208464 A1 | 9/2007 | Moorhead | |
| 2008/0015955 A1* | 1/2008 | Ehrman | G06Q 10/06 705/28 |
| 2010/0228405 A1* | 9/2010 | Morgal | B62H 3/02 701/2 |
| 2011/0295078 A1* | 12/2011 | Reid | G06Q 50/22 600/300 |
| 2012/0016607 A1* | 1/2012 | Cottrell | G05B 23/0229 702/62 |
| 2012/0166249 A1* | 6/2012 | Jackson | B64F 5/0045 705/7.28 |
| 2013/0282336 A1* | 10/2013 | Maeda | G05B 23/02 702/184 |

* cited by examiner

MACHINE ASSET MANAGEMENT SYSTEM HAVING USER INTERFACE

TECHNICAL FIELD

The present disclosure relates to a management system, and more particularly, to a machine asset management system having a user interface.

BACKGROUND

Machines, such as passenger vehicles, trains, airplanes, marine vessels, construction equipment, etc., include many components that are susceptible to wear and failure over time. For instance, trains operating on a railroad network may each include multiple associated assets, such as one or more locomotives and a series of linked rail vehicles that can, in some cases, span sections of rail over a mile long. Train assets may also include stationary wayside equipment located throughout the railroad network. Each asset can have multiple components that are susceptible to wear and failure over time, which, if not properly addressed, can lead to operational inefficiencies and possible economic penalties associated with delayed operations.

To reduce inefficiencies, diagnostic systems have been implemented that alert operators and machine controllers of component failures. Diagnostic systems often include one or more sensors associated with each component and one or more controllers that detect abnormalities based on signals generated by the sensors. However, diagnostic systems associated with complex machines, such as trains that have multiple assets, can generate large amounts of data that can be difficult to organize and interpret. Such difficulties can lead to the pursuance of ineffective and/or inefficient remedial measures, as well as further operational delays and associated penalties.

A system for diagnosing machine components is disclosed in U.S. Pat. No. 8,082,076 (the '076 patent) that issued to Sells et al., on Dec. 20, 2011. In particular, the '076 patent describes a system generating operational data of a machine and displaying diagnostic information based on the data. The system includes a number of sensors associated with components of the machine that monitor various operating parameters of the components. A controller receives the signals from the sensors and compares the signals to threshold values stored in a fault code table. Based on the comparison, the controller identifies fault codes, which indicate that a component associated with the fault code has failed. The controller then renders a 3-D model of the failed component and/or an associated machine system or subsystem and displays the 3-D model via the user interface. The operator may select components contained within the 3-D model to view the identification and replacement information of the component.

While the system of the '076 patent may allow the operator to visualize a machine component that has failed and facilitate its replacement, other diagnostic features may yet be realized.

The disclosed asset management system having a user interface is directed to overcoming one or more of the problems set forth above and/or other problems of the prior art.

SUMMARY OF THE INVENTION

One aspect of the disclosure is directed to an asset management system for a machine. The asset management system may include a sensor associated with an asset of the machine and configured to generate a signal indicative of an operational status of a system associated with the asset. The asset management system may further include a user interface associated with the machine and a controller in communication with the sensor and the user interface. The controller may be configured to display on the user interface a graphical representation of the asset, receive via the user interface a user selection of the system from a plurality of systems associated with the asset, and display on the graphical representation of the asset a visual indicator of the system in response to the user selection. The visual indicator of the system may be indicative of the operational status of the system.

Another aspect of the disclosure is directed to an asset management system for a train having a plurality of train assets. The asset management system may include a plurality of sensors, each being configured to generate a signal indicative of an operational status of a respective one of the plurality of train assets, a user interface associated with the train, and a controller in communication with the plurality of sensors and the user interface. The controller may be configured to display on the user interface one or more maintenance messages, wherein each of the one or more maintenance messages is based on the signal generated by one of the plurality of sensors. The controller may be further configured to receive via the user interface a user selection of one of the one or more maintenance messages, wherein the selected maintenance message is associated with one of the plurality of train assets. The controller may be further configured to display on the user interface a graphical representation of the train asset associated with the selected maintenance message.

Yet another aspect of the disclosure is directed to an asset management system for a train having a plurality of assets. The asset management system may include a plurality of sensors, each being configured to generate a signal indicative of an operational status of a respective one of the plurality of train assets, a user interface associated with the train, and a controller in communication with the plurality of sensors and the user interface. The controller may be configured to receive via the user interface a user selection of a system from a plurality of displayed systems associated with one of the plurality of train assets, receive via the user interface a user selection of a maintenance messages from one or more displayed maintenance messages associated with the plurality of train assets, and display on the user interface a graphical representation of a train asset associated with the selected system or with the selected maintenance message.

DETAILED DESCRIPTION

Figure 1:
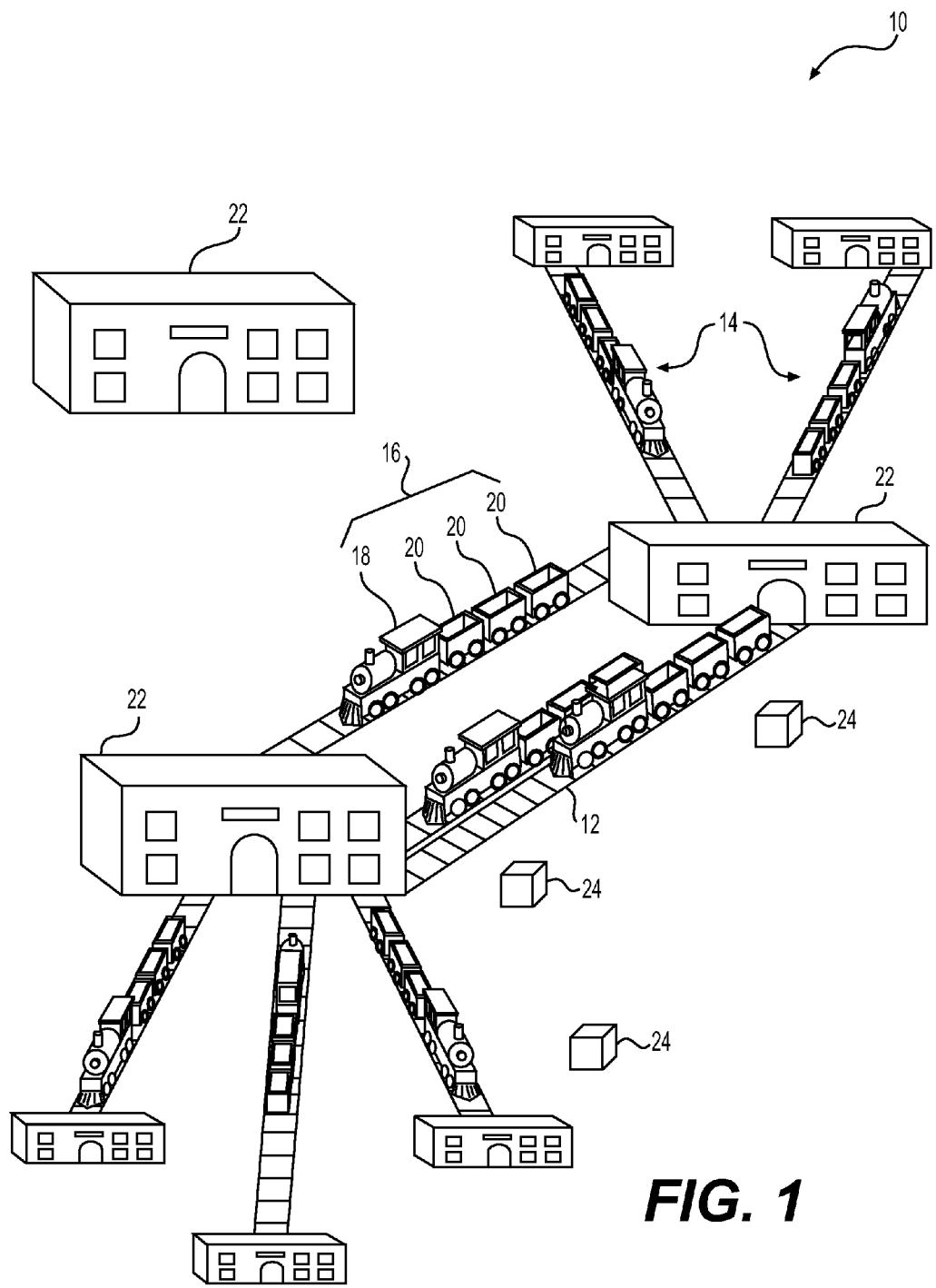
FIG. 1 is a schematic illustration of an exemplary disclosed machine network.

FIG. 1 schematically illustrates an exemplary railroad network 10. Railroad network 10 may include any number of tracks 12 that support a plurality of machines, such as trains 14. Tracks 12 may be, for example, railroad tracks, subway rails, trolley tracks, etc., on which trains 14 may travel. It is noted, however, that while railroad network 10 is depicted in FIG. 1 for purposes of this disclosure, other types of machine networks may be used in other embodiments. For example, in other embodiments, machine networks of individual machines (e.g., cars, haul trucks, construction machines, nautical vessels, aircraft, etc.) within certain operating boundaries (e.g., roads, waterways, airways, jobsites, etc.) may be used.

Trains 14 may each include one or more linked train assets (assets) 16 that are configured to travel in unison on tracks 12. Assets 16 may include locomotives 18, wagons 20, and/or other types of vehicles or containers that are configured to travel on tracks 12. For example, assets may include fuel-powered (e.g., diesel, natural gas, coal, etc.) locomotives, electric-powered locomotives, tender cars, passenger cars, boxcars, coal cars, tanker cars, etc. In other embodiments, assets 16 may include one or more machines operating together to complete a task, such as, for example, a group of construction machines on a jobsite, a group of haul trucks in a geographic region, a group of airplanes in a portion of airspace, etc.

A control station 22 may be located near or away from tracks 12 and used by operators and/or electronic controllers to oversee movement of trains 14 throughout railroad network 10. In some embodiments, control station 22 and/or its components may be located onboard one or more of trains 14. In other embodiments, control station 22 may be located off-board trains 14. For example, control station 22 may be located at a rail yard, a management facility, a port, or another location. Control station 22 may also or alternatively embody a computing device connected to a communication network, such as a special-purpose computer, a multi-purpose computer, a cellular phone, a tablet, or another type of stationary or portable computing device. Although only one control station 22 is illustrated in FIG. 1, it is contemplated that railroad network 10 may include any number of control stations 22, as desired.

In some embodiments, wayside equipment 24 may be positioned near or in the vicinity of tracks 12. Wayside equipment 24 may include various control devices, such as axle hot box detectors, wheel load detectors, track switches, speed restriction signs, signal lights, gates, scanners (barcode readers, RFID readers, etc.) or other devices configured to monitor and/or manage rail vehicle traffic in railroad network 10. For instance, control station 22 may send control signals to wayside equipment 24 to facilitate passage of trains 14 through railroad network 10 and receive information from wayside equipment 24 to facilitate monitoring of assets 16.

Figure 2:
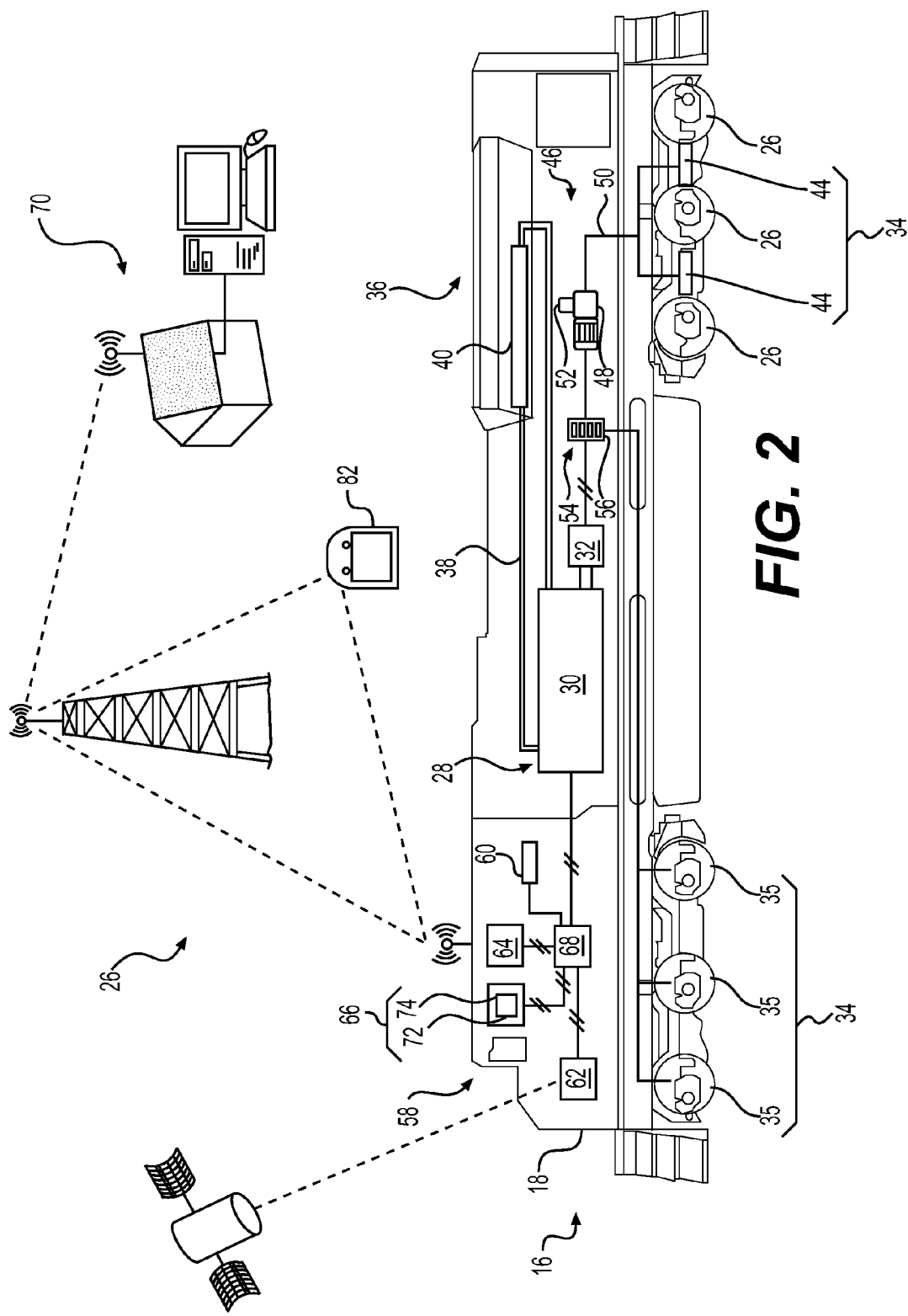
FIG. 2 is a schematic illustration of an exemplary disclosed machine asset and asset management system that may be used in conjunction with the machine network of FIG. 1.

FIG. 2 shows an exemplary train asset 16 in communication with an exemplary disclosed asset management system 26 that may be associated with railroad network 10 (referring to FIG. 1). For the purposes of this disclosure, asset 16 in FIG. 2 is depicted as a locomotive 18. However, it is noted that any type of asset 16, such as a wagon 20 or other equipment, such as wayside equipment 24, may be a train asset in communication with asset management system 26.

Locomotive 18 may be a fuel-burning locomotive. For example, locomotive 18 may include an engine system 28 having one or more fuel-burning engines 30 (only one shown in FIG. 2). Engine 30 may be an internal combustion engine (e.g., a piston engine, a turbine engine, etc.) configured to burn a fuel (e.g., diesel, petrol, natural gas propane, kerosene, etc.) supplied by a fuel system 31 in order to generate a mechanical power output. The output of engine 30 may be used to drive a generator 32 (e.g., an AC generator, a DC generator, etc.) configured to supply electricity to a traction system 34 having one or more traction motors 35 for propelling locomotive 18 on a plurality of wheels 33 and axles (not shown). Engine 30 may alternatively be configured to directly drive wheels 33 with the mechanical output via drivetrain components, such as gears, clutches, torque converters, shafts, etc. In other embodiments, engine 30 may be a fuel-fired furnace (e.g., a coal furnace) configured to produce steam power for propelling locomotive 18.

A cooling system 36 may be configured to actively cool engine 30 and/or other components of locomotive 18. Cooling system 36 may include, for example, fluid conduits 38 that circulate a cooling fluid (e.g., water, a coolant, etc.) between a heat source (e.g., such as engine 30, generator 32, etc.) and a heat sink, such as a heat exchanger 40. Heat exchanger 40 may include a number of fluid passages configured to allow heated fluid therein to transfer heat to a cooler fluid (e.g., air, water, etc.) passing between or around the fluid passages. Cooling system may also include one or more cooling fluid pumps, valves (e.g., control valves, manual valves, etc.), fans, sensors, and/or other components.

Locomotive 18 may also include one or more brake systems 42 (only one shown in FIG. 2) configured to reduce the track speed of locomotive 18. For example, brake systems 42 may include one or more braking devices 44 positioned near a rotary component (e.g., a brake disk, brake drum, etc.). Braking devices may include a caliper and pads, shoes and linkages, magnetic brakes (e.g., eddy current brakes), or another type of braking device. As shown in FIG. 2, braking devices 44 may be actuated by a compressed air system 46. In other embodiments, braking devices may be powered hydraulically, mechanically, a combination thereof, or by another method. Locomotive 18 may also or alternatively include other types of braking systems, such as parking brakes, auxiliary brakes, electronically controlled pneumatic brakes, etc.

Compressed air system 46 may include one or more air compressors 48 (only one shown in FIG. 2) configured to pressurize air for use throughout locomotive 18. Pressurized air conduits 50 may be configured to transport pressurized air from compressor 48 to various devices within locomotive, such as braking devices 44, suspension equipment, etc. Compressor 48 may be driven by an electric motor 52 that may be powered by generator 32, a battery, or another source of electricity. In other embodiments, compressor 48 may be autonomously powered by a dedicated engine (e.g. a fuel-burning engine).

An electrical system 54 may supply and/or control electrical power to various electrical devices associated with locomotive 18. Electrical system 54 may supply electrical power via generator 32, a dedicated engine and generator, one or more batteries or battery banks, a connection to grid power, or another source of electricity. Electrical power may be distributed throughout electrical system 54 via one or more circuit breakers 56 (only one shown in FIG. 2). For example, electricity from generator 32 may be distributed to traction motors 35 via circuit breaker 56 for propelling locomotive 18. Electrical system 54 may also power a locomotive control system 58 and/or other electronic control devices. Electrical system 54 may include additional circuit breakers, fuses, receptacles, lights (e.g., headlights, running lights, interior lights, etc.), and or other components.

Control system 58 may include one or more components associated with manual and/or automatic control of locomotive 18 and/or train 14. For example, control system 58 may include one or more sensors 60, a locating device 62, a communication device 64, a user interface 66, and a controller 68 in communication with each of the other components. Additional and/or other components of control system 58 may be included, if desired. Components of control system 58 may be configured to communicate by wired (e.g., dedicated wire, local area network (LAN), controller are network (CAN), wide area network (WAN), etc.) and/or wireless (e.g., WiFi, Bluetooth, cellular, satellite, RFID, etc.) connections.

Sensors 60 may be positioned throughout locomotive 18 and or other assets 16 of train 14 (referring to FIG. 1). Sensors 60 may each be configured to generate a signal indicative of an operating parameter and/or an operational status of an associated system, subsystem, and/or component of locomotive 18. Sensors 60 may be configured to generate signals indicative of, for example, temperature, pressure, position, current, voltage, presence (e.g., via optical sensors, cameras, etc.), air flow, fuel flow, exhaust constituents, air/fuel ratio, light intensity, etc. One or more sensors 60 may be associated with each of systems 28, 31, 34, 36, 42, 46, 54, 58, and/or other systems, subsystems, and/or components of locomotive 18. Signals generated by sensors 60 may also be indicative of an operational status of sensors 60 themselves and/or their associated systems, subsystems, and/or components. For example, the integrity, strength, and/or nature of the signals generated by sensors 60 may be indicative of whether the respective sensor and/or associated systems, subsystems, and/or components are functioning properly. Signals from sensors 60 may be communicated to controller 68 for further processing.

Locating device 62 may be configured to determine and communicate an absolute and/or relative geographic location of locomotive 18. For example, locating device 62 may include a Global Positioning System (GPS) transponder configured to receive position signals from one or more GPS satellites, an Inertial Reference Unit (IRU), or any other locating device known in the art. Locating device 62 may communicate the positioning signals and/or other information to controller 68 for further processing.

Communication device 64 may include any device configured to facilitate communications between controller 68 and off-board entities, such as an off-board system 70. Communication device 64 may include hardware and/or software that enables communication device 64 to send and/or receive data messages through a wireless communication link. Communication device 64 may be configured to communicate via wireless communication platforms, such as by satellite, cellular, infrared, Bluetooth, WiFi, and/or other wireless communication platforms. Communication device may also or alternatively be configured to communicate via a local area network (LAN) or another type of wired network that enables controller 68 to exchange information with off-board entities.

User interface 66 may be located inside an operator station of locomotive 18, and may include a data entry module 72 for manually receiving data from an operator and a display 74 for displaying information to the operator. Data entry module 72 may include a keyboard, mouse, touchscreen, directional pad, selector buttons, or any other suitable features for recording manually entered data. User interface 66 may also include one or more devices for controlling operations of locomotive 18 and/or train 14. For example, user interface 66 may include a throttle control, a brake control, a lighting control, and/or other controls. Control devices may embody levers, knobs, switches, buttons, slides, handles, touch screens, soft keys, and/or other types of controls. User interface 66 may also be configured to allow the operator to engage or communicate with train and/or train asset control systems. That is, information and requests for input from one or more control systems may be shown to the operator via display 74, and the operator may provide responses and/or other input via data entry module 72. Inputs entered via data entry module may be communicated to controller 68 for further processing.

Off-board system 70 may represent one or more computing systems associated with railroad network 10, control station 22, assets 16 (e.g., locomotives 18, wagons 20, wayside equipment 24, etc.), and/or other components of railroad network 10. Off-board system 70 may be configured to allow a user to engage control system associated with trains 14 and/or train assets 16 in railroad network 10. Information and requests for input from one or more train and/or train asset control systems may be shown to the user off-board system 70. Off-board system 70 may also be configured to allow the user to provide responses and/or other inputs to train and/or train asset control systems. Off-board system 70 may embody, for example, one or more of a laptop computer, a work station, a personal digital assistant, a mainframe, a cellular phone, a tablet, a computerized accessory (e.g., pair of glasses, a watch, etc.) and/or other computing systems known in the art.

Figure 3:
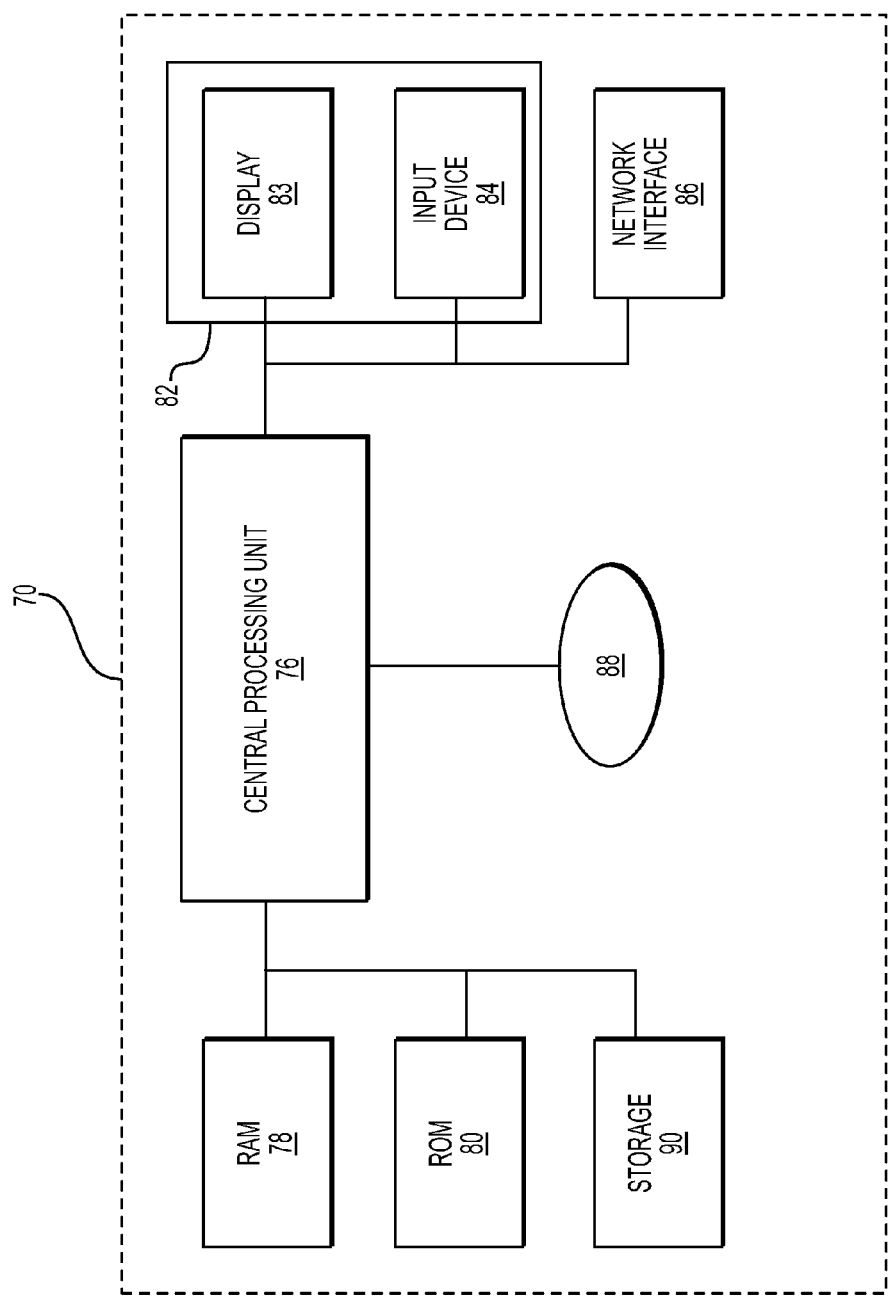
FIG. 3 is a diagrammatic illustration of an off-board control system that may be used in conjunction with the asset management system of FIG. 2.

As shown in FIG. 3, off-board system 70 may include a central processing unit (CPU) 76, a random access memory (RAM) 78, a read-only memory (ROM) 80, a user interface 82, an input device 84, a network interface 86, a database 88 and storage 90. It is contemplated that off-board system 70 may include additional, fewer, and/or different components than those listed above. It is to be understood that the type and number of listed devices are exemplary only and not intended to be limiting.

CPU 76 may embody, for example, one or more specially-constructed or generic microprocessors configured to execute sequences of computer program instructions to perform various processes in connection with asset management system 26. The computer program instructions may be loaded into RAM 78 for execution by CPU 76 from ROM 80. During operation, CPU 76 and/or controller 68 may cooperate via communication device 64 to carry out various processes in connection with asset management system 26.

Storage 90 may embody any appropriate type of mass storage provided to store information that CPU 76 and/or controller 68 may access to perform various processes. For example, storage 90 may include one or more hard disk devices, optical disk devices, removable memory devices, solid state memory devices, flash memory devices, and/or other storage devices.

Off-board system 70 may be configured to interface with a user via user interface 82. User interface 82 may include a display 83 and input device 84. For example, user interface 82 may display information to users of off-board system 70 via display 83 and receive user inputs via input device 84. User interface 82 may be any appropriate type of display device, such as a computer monitor, laptop screen, cellular phone screen, etc. Input device 84 may include, for example, a keyboard, a mouse, a touch screen, buttons, soft keys, and/or other wired or wireless user interfaces known in the art.

Network interface 86 may facilitate wireless and/or wired communications such that off-board system 70 may be remotely accessed by controller 68 and/or other off-board systems (not shown). Network interface 86 may include and/or be associated with any suitable wired and/or wireless network architecture, such as, for example, a cellular telephone-based network (such as a PBX or POTS), a satellite-based network, LAN, WAN, CAN, a dedicated intranet, the Internet, and/or any other suitable network architecture known in the art.

Database 88 may contain, among other things, information relating to each train 14, information relating to each asset 16, and/or information relating to operational states or conditions of each asset 16. For example, database 88 may store an up-to-date list of every train 14 and associated asset 16 operating in railroad network 10. Database 88 may also store an up-to-date list of every system (e.g., systems 28, 31, 34, 36, 42, 46, 54, and 58) and/or component associated with each asset 16 and known data associated with each asset 16. For example, database 88 may store the latest information for each asset 16, such as, for example, a name, a serial number, a software version number, a system list, a component list, a part number list, and/or a date of manufacture for the asset. The train information and asset information may be kept current by, for example, automatic or manual electronic updates and/or by an authorized user of off-board system 70.

The information contained in database 88 may include diagnostic information that can be used to identify one or more operational statuses or fault conditions of each asset 16 and/or associated systems and components. For example, the diagnostic information may include tables of fault codes and associated triggering mechanisms, such as, signal criteria (e.g., strength, integrity, on/off, etc.), operating parameter thresholds or limits (e.g., temperatures, pressures, levels, times, etc.), and or other triggers. Each fault code may correspond to or be indicative of an issue pertaining to a type of asset, an asset system, a system component, or maintenance aspect. Triggering mechanisms may be monitored or detected via sensors 60, wayside equipment 24, operators, and/or other diagnostic devices.

Operational statuses may be linked to fault conditions and may include various statuses, such as a satisfactory status, an attention status, or a failed status. It is noted, however, that other, more, or fewer operational statuses may be used. For example, a satisfactory status may indicate that no attention is currently needed in connection with the associated asset, system, or component. That is, a satisfactory status may indicate, for example, that an associated sensor is present and functioning, that an associated sensor is producing a signal of sufficient quality (e.g., strength, integrity, low intermittence, etc.), or that detected operating parameters are within certain value limits, thresholds, or ranges that are suitable for operation.

An attention status may indicate, for example, that an associated sensor is not functioning properly, that an associated sensor is producing a faulty signal (e.g., with low strength, frequent intermittence, etc.), or that one or more operating parameters are exceeding certain values limits, thresholds, or ranges. An attention status may also indicate that corrective measures may be taken to restore operations to a satisfactory status, although such correction may not be so urgent as to require operations to be stopped. In some embodiments, an attention status associated with a particular component may correspond to or trigger an attention status of a system and/or asset associated with the component, such that the associated asset and/or system may appear to need attention until the component has been serviced.

A failed status may indicate, for example, that an associated sensor has failed (e.g., is not producing a signal), that the signal from an associated sensor is indicating a system or component failure, or that one or more operating parameters have exceeded certain values limits, thresholds, or ranges and require attention to restore all functionality or prevent further damage. In some embodiments, a failed status associated with a component may correspond to or trigger a failed status of a system and/or asset associated with the failed component, such that the associated asset and/or system may appear to have a failed status until the component has been serviced.

It should also be noted that a different number and/or different types of databases may be included within off-board system 70 and utilized by CPU 76, if desired. It is further contemplated that the information described above as being stored in database 88 may additionally or alternatively be stored within the memory of CPU 76 or elsewhere in off-board system 70, if desired. At least some of the information described as contained within database 88 may be additionally or alternatively stored on controller 68, if desired.

Controller 68 (referring to FIG. 2) may embody, for example, an electronic control module (ECM), or another processor capable of executing, and/or or outputting command signals in response to received and/or stored data. Controller 68 may include means for accessing, reading, and processing stored information and for displaying such information by way of user interface 66 and/or 82. For example, controller 68 may embody a single microprocessor or multiple microprocessors that include a means for monitoring input from user interfaces 66, 82, and/or sensors 60. Controller 68 may include a memory, a secondary storage device, and a processor, such as a central processing unit or any other means for accomplishing a task consistent with the present disclosure. Commercially available microprocessors can be configured to perform the functions of controller 68. It should be appreciated that controller 68 could readily embody a general machine controller capable of controlling numerous other machine functions. Various other known circuits may be associated with controller 68, including signal-conditioning circuitry, communication circuitry, and other appropriate circuitry.

Controller 68 may be configured to continually receive signals from sensors 60 and analyze the signals to determine an operational status of sensors 60 and/or the components, systems, and/or subsystems they monitor. For example, controller 68 may be configured to compare the signal generated by each sensor 60 to thresholds, ranges, or limits associated with fault codes stored within its memory. Based on each comparison, controller 68 may be configured to determine the operational status of each component, system, and subsystem of locomotive 18. When a comparison indicates that an associated fault code is active, controller 68 may retrieve the diagnostic information associated with the fault code from database 88. Based on the fault code, the associated diagnostic information, and/or other information, controller 68 may be configured to generate a maintenance message and display the message to a user via a graphical user interface (GUI) 92, as shown in FIGS. 4-8.

Figure 4:
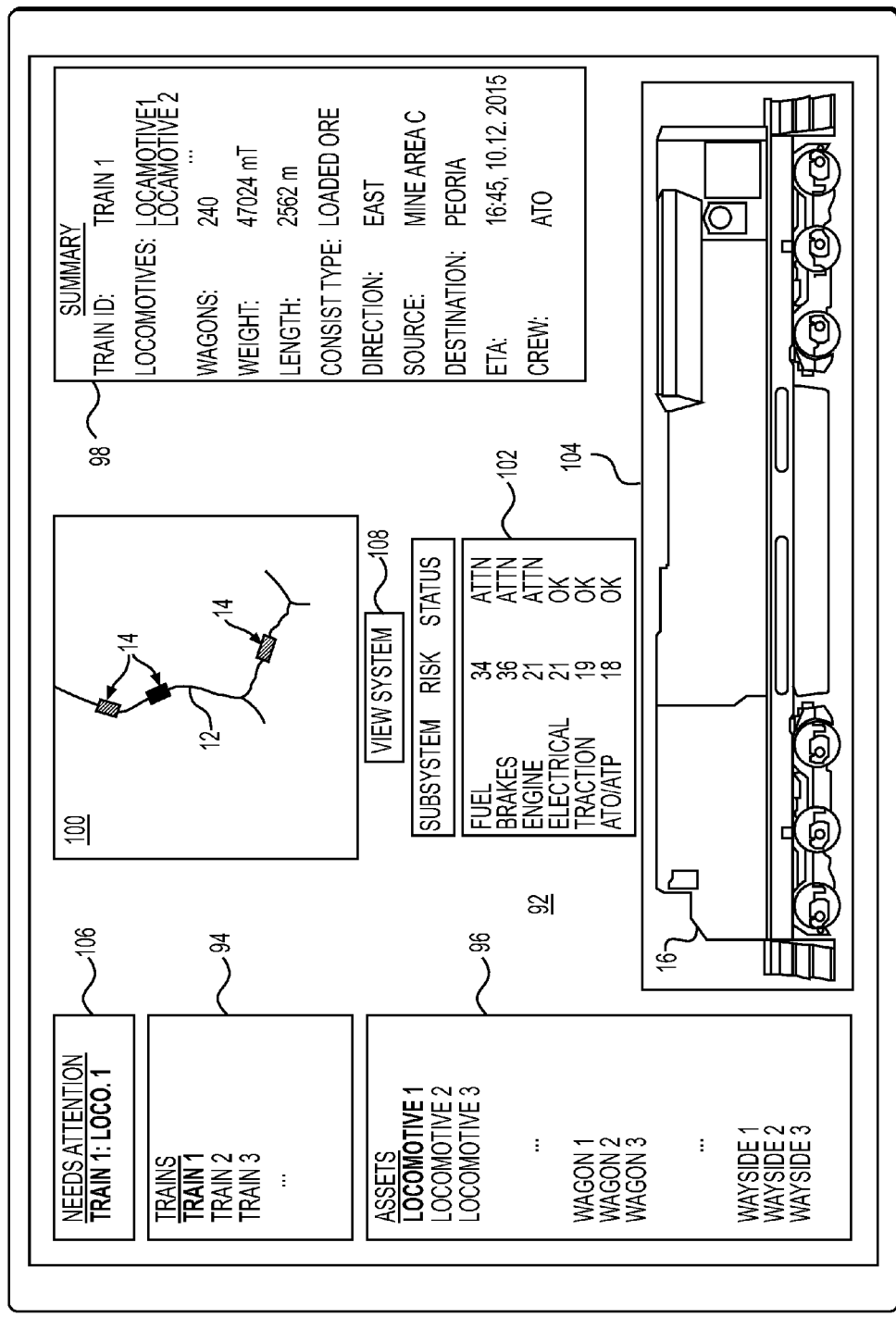
FIGS. 4-8 are pictorial illustrations of exemplary disclosed graphical user interfaces (GUI) that may be used in conjunction with the asset management system of FIG. 2.

Referring to FIG. 4, GUI 92 may be a graphic display tool including menus (e.g., drop-down menus), modules, buttons, toolbars, text boxes, field boxes, and other means to facilitate the conveyance and transfer of information between a user and off-board system 70 and/or controller 68 (referring to FIG. 2). It is to be appreciated that GUI 92 may require user authentication, such as, for example, a username, a password, a pin number, an electromagnetic passkey, etc. For example, GUI 92 may show a list 94 of trains 14 that are selectable by the user for monitoring and control. Assets 16 associated with the selected train 14 (e.g., TRAIN 1) may be shown in a list 96 of assets 16 that are selectable by the user for monitoring and control. Information relating to the selected train 14 and a selected asset 16 (e.g., LOCOMOTIVE 1) may be displayed on GUI 92 via one or more display areas.

For example, GUI 92 may include a train summary area 98, a map 100, an asset system area 102, and a graphical representation 104 of the selected asset 16. Train summary area 98 may display summary information, such as train and asset IDs, a train weight, a train length, a train heading, etc. Map 100 may show a layout of tracks 12 for at least a portion of railroad network 10, as well as the locations of one or more trains 14 and assets 16. Asset system area 102 may show a list of asset systems associated with the selected asset that may be selectable by the user for monitoring and control. Asset system area 102 may also show failure risk value (e.g., a risk level number, a risk level percent, a probability of failure, etc.) and the operational status (e.g., OK, ATTN, FAIL, etc.) of each listed system. The list of asset systems may be ordered such that any asset systems that require attention or have failed are listed first, thereby allowing the user to quickly identify systems needing attention. Graphical representation 104 of the selected asset 16 may be a pictorial or schematic view of the selected asset 16 that allows the user to visualize the selected asset 16 during analysis. To allow users to quickly address issues that may or have occurred, GUI 92 may include an alert area 106 configured to show a list of selectable trains 14 and or assets 16 needing attention that, when selected by the user, automatically cause graphical representation 104 to be updated with an image of the selected asset 16. Controller 68 may be configured to receive via user interface 66, 82 a user selection of an asset system (e.g., from asset system area 102, alert area 106, etc.) and display a visual indicator of the selected system on the graphical representation 104 of the selected asset 16 to allow for quick visual inspections of asset systems.

Figure 5:
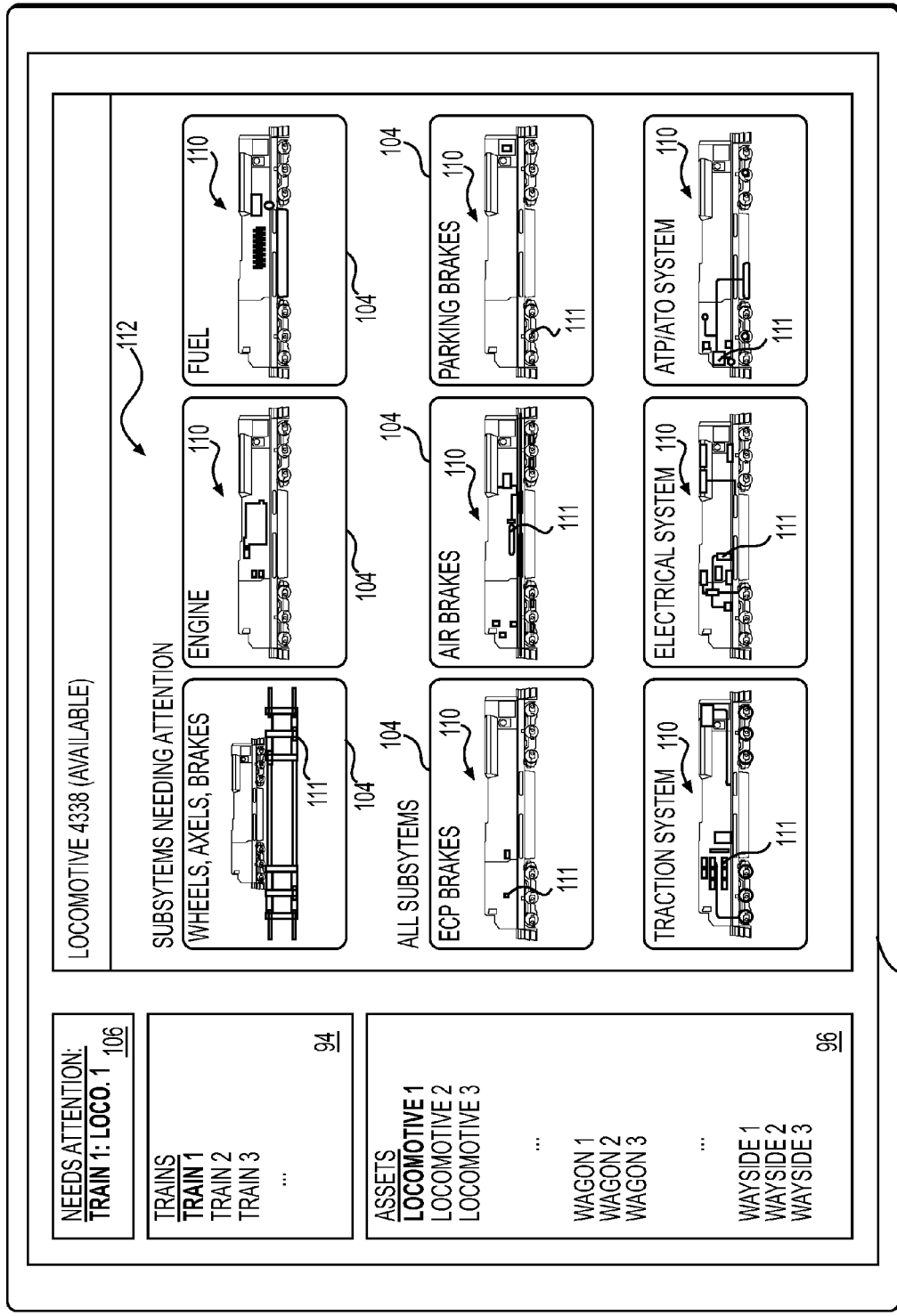

GUI 92 may also include a button 108 that, when selected by the user, causes visual indicators 110 of one or more systems associated with the selected asset 16 to be displayed on GUI 92, as shown in FIG. 5. Each visual indicator 110 may be displayed on a separate respective graphical representation 104 of the selected asset 16, and each graphical representation 104 may be individually selectable by the user. Each visual indicator 110 may resemble a physical layout of a respective asset system and may include one or more symbols 111 of one or more system components. For example, visual indicators 110 may resemble one or more of engine system 28, fuel system 31, traction system 34, cooling system 36, brake system 42, compressed air system 46, electrical system 54, control system 58, and or other systems associated with asset 16. Symbols 111 may resemble actual components associated with a respective asset system, such as, for example, wires, batteries, control modules, pumps, engines, circuit breakers, heat exchangers, brake components, motors, fluid tanks, etc.

Controller 68 may be configured to display via GUI 92 a system priority area 112 that displays one or more asset systems that need attention or have failed, thereby allowing the user to quickly identify issues to address. For example, controller 68 may be configured to determine when each of the plurality of systems associated with the selected asset 16 is associated with an attention status or a failed status. Controller 68 may then populate system priority area 112 with one or a plurality of graphical representations 104 of the selected asset, each containing a visual indicator 110 of the asset systems associated with an attention status or a failed status. Each graphical representation within system priority area 112 may be selectable by the user for further analysis.

Each asset component symbol 111 shown in a respective visual indicator 110 on GUI 92 may be indicative of an operational status of the component and/or the associated asset system. For example, each asset component may be shown in a certain color, the color being indicative of the operational status. In some embodiments, components having a satisfactory status may be displayed in a first color, components having an attention status may be displayed in a second color different from the first color, and components having a failed status may be displayed in a third color different from the first and second colors. Each operational status may be associated with any respective color, as desired. For example, components having a satisfactory status may be shown in blue, components having an attention status may be shown in yellow, and failed components may be shown in red. It is understood, however, that any color may be associated with each operational status, as desired. In this way, the status, location, and or identification of components needing attention or replacement may be quickly and easily identified. In other embodiments, other recognizable indications may be associated with each operational status, such as fill patterns, flashing objects, shadowing, etc.

Figure 6:
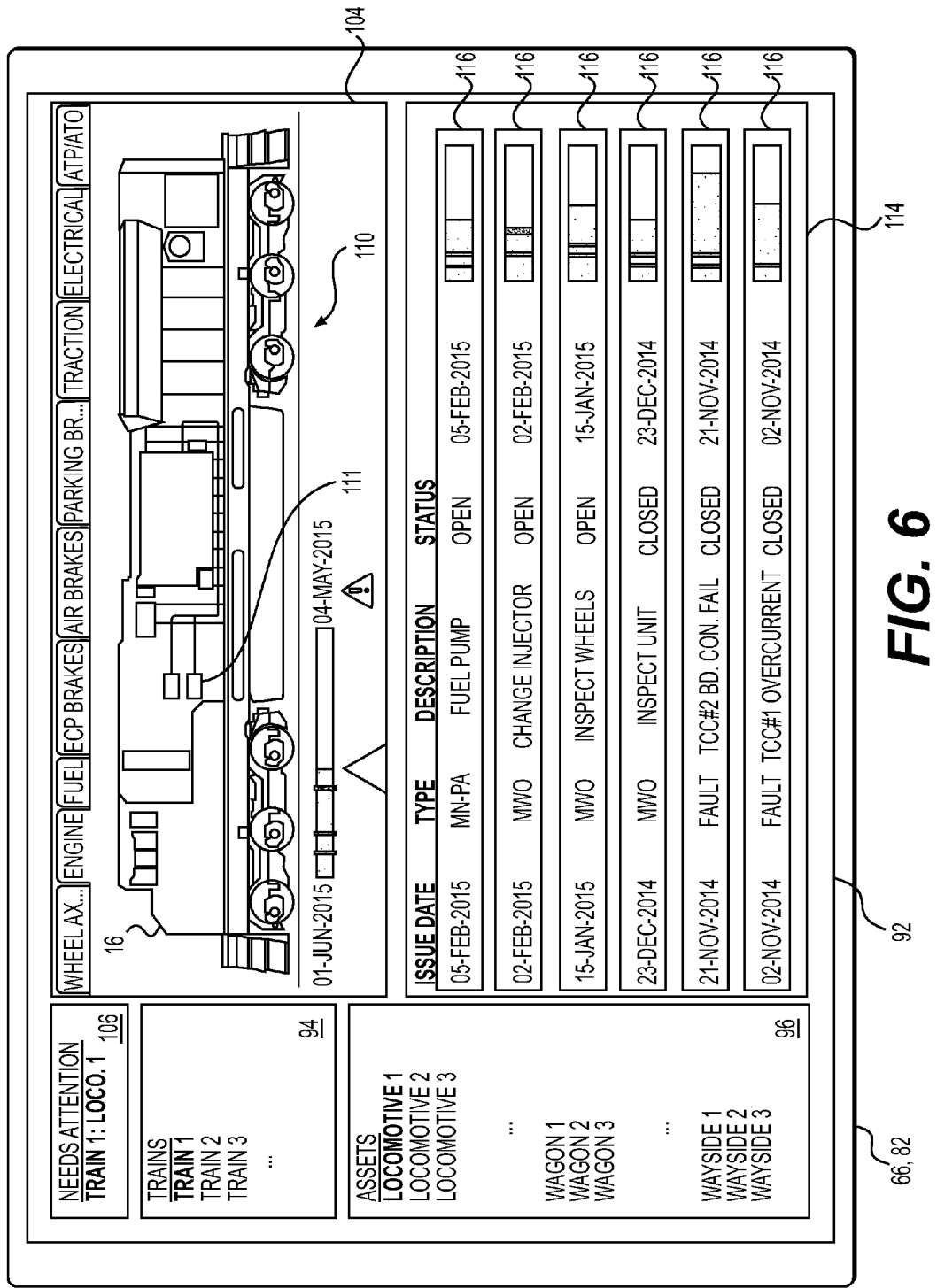

Controller 68 may be configured to receive via user interface 66, 82 a user selection of an asset system from the plurality of systems associated with the selected asset 16 displayed via graphical representations 104. When a user selects one of the graphical representations 104 of the selected asset, GUI 92 may be caused (e.g., by controller 68) to isolate the selected graphical representation 104 and display on it a visual indicator 110 of an associated system in response to the user selection, as shown in FIG. 6. Visual indicator 110 may be changeable via one or more buttons associated with GUI 92 to allow the user to view different asset systems and associated components in isolation. The selected visual indicator 110 may include symbols 111 that resemble components of an associated asset system and indicate the operational status (e.g., satisfactory status, attention status, failed status, etc.) of the components and/or system.

Controller 68 may also display via GUI 92 diagnostic area 114 that includes a list of subsystems and/or components that are associated with an asset subsystem having an attention status or failed status. Diagnostic area 114 may include information relating to the status of each subsystem and/or component on the list. For example, diagnostic area 114 may include a date that the status was generated, a type of fault code associated with the status, a subsystem or component name, an indication of whether the issues has been addressed (e.g., "OPEN" or "CLOSED"), and/or a timeline indicating when the operational status of the associated system, subsystem, or component changed to a different status. Each line on the list may represent a maintenance message 116 associated with a signal generated by one of sensors 60 and be selectable by the user for further analysis. For example, when a user selects a maintenance message 116 on the list, the associated system, subsystem, and/or components may be shown via visual indicator 110 on graphical representation 104. In this way, users may be able to quickly visualize asset systems, subsystems, and components brought to their attention, while also having the freedom to change to any available view on GUI 92 during maintenance or diagnostic operations.

Figure 7:
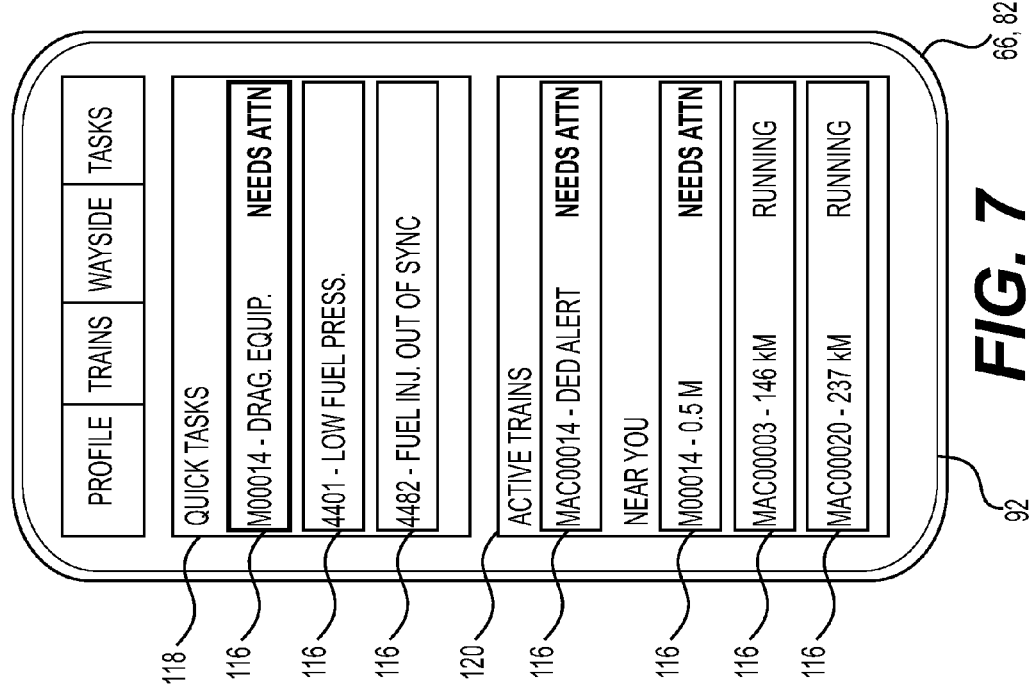

Controller 68 may also be configured to generate any of the above described information for display on a mobile electronic device. For example, when user interface 66, 82 is a mobile electronic device, such as a mobile computer, personal digital assistant, cellular phone, tablet, computerized watch, computerized glasses, etc., GUI 92 may be limited in size as compared to when user interface 66, 82 is associated with, for example, a personal computer, laptop, work station, etc. To allow users to quickly identify issues relating to maintenance and diagnostic operations, controller 68 may display on user interface 66, 82 a quick task area 118 containing one or more maintenance messages 116 and an active train area 120 containing a list of active trains, as shown in FIG. 7.

Each maintenance message 116 may be based on the signal generated by one of sensors 60 and indicative of information associated with an asset system, subsystem, or component associated with the respective sensor 60. For example, maintenance messages 116 may indicate which train 14, asset 16, system, subsystem, or component is at issue, as well as an indication of its operational status. Maintenance messages 116 may also include information associated with tasks, notes, reminders, requests, orders, instructions, and/or other information entered by another user, operator, manager, technician, etc. For example, a user may enter a task associated with an asset system and request that the system be inspected for a particular reason. The task may be viewed as a maintenance message 116 and displayed in quick task area 118. Maintenance messages 116 may be listed according to a desired priority scheme, such as by operational status, message date, message type, etc.

Active train area 120 may also include one or more maintenance messages 116 that contain a train identification and associated diagnostic information. Maintenance messages 116 may include an operational status for each listed train 14 to indicate whether each respective train 14 requires attention, is running, or has stopped. Trains 14 that require attention or have stopped may be prioritized and positioned near the top of a list for quick identification by the user. Active train area 120 may include separate lists to allow trains 14 to be prioritized in multiple ways. For example, a train that has a top priority issue or has already been selected by the user may be displayed in a list of active trains 14. Active train area 120 may also include a list of one or more trains 14 in a certain geographic area near the user, identifying each train by name and distance from the user. Other types of lists and organization criteria may be used, if desired.

Figure 8:
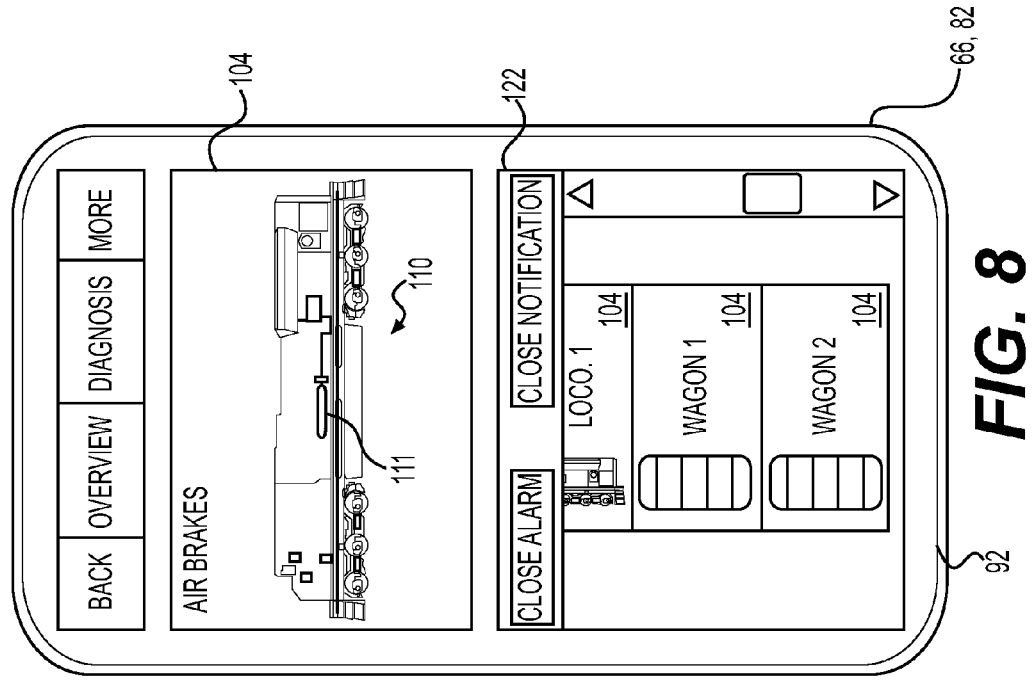

Each maintenance message 116 may be selectable by the user and associated with one of the plurality of train assets 16. Controller 68 may receive via user interface 66, 82 a user selection of a maintenance message 116 from quick task area 118 or active train area 120, and display on the user interface 66, 82 a graphical representation 104 of the train asset 16 associated with the selected maintenance message 116, as shown in FIG. 8. The graphical representation 104 may include a visual indicator 110 of an asset system associated with the selected maintenance message 116, and the visual indicator 110 may be indicative of an operational status of the associated system and/or one or more components within the system. For example, visual indicator 110 may include one or more symbols 111 representing subsystems and/or components of the asset system, and each symbol 111 may be indicative of an operational status, for example, in the manor described above.

Controller 68 may also be configured to display a graphical representation 104 of each train assets 16 associated with one of the plurality of maintenance messages 116. For example, controller 68 may be configured to display an asset view area 122 on GUI 92 that shows each asset 16 of an associated train 14 that has an associated maintenance message 116. In this way, users may be able to quickly visualize and make an assessment of each asset that has an associated maintenance message. In some embodiments, asset view area 122 may be scrollable to allow the user to view multiple assets 16 in a limited space on user interface 66, 82. To help users quickly determine the location of assets 16 needing attention relative to a first end of train 14, a second end of train 14, or another asset 16, asset view area may list assets 16 in an order corresponding to a relative order of assets 16 as they physically appear in train 14.

In some embodiments, controller 68 may be configured to display a graphical representation of train 14 that includes a visual indicator of each asset 16 in train 14. That is, all assets 16 associated with train 14 may be shown on GUI 92 to allow the user to visualize the location of each asset 16 with respect to an absolute position in train 14. In these embodiments, graphical representations 104 of each asset 16 may be shown in an order corresponding to an absolute order of assets 16 in train 14, and each graphical representation 104 may be indicative of the operational status each respective asset 16. For example, each graphical representation 104 may be indicative of a satisfactory, attention, or failed status, thereby allowing the user to quickly examine each asset 16 in train 14 and determine which assets require attention, which do not, and where each is located in terms an absolute or relative position.

If an alarm or task notification was shown in a maintenance message 116 for an asset 16, the user may select an asset via GUI 92 to view the alarm or notification details. GUI 92 may also include one or more buttons to allow the user to close the selected alarm or notification or its associated maintenance message. In this way, assets 16 may be quickly assessed and managed by users onboard or off-board train 14.

One skilled in the art will realize that the processes illustrated in this description may be implemented in a variety of ways and include other modules, programs, applications, scripts, processes, threads, or code sections that may all functionally interrelate with each other to accomplish the individual tasks described above for each module, script, and daemon. For example, these programs modules may be implemented using commercially available software tools, using custom object-oriented code written in the C++ programming language, using applets written in the Java programming language, or may be implemented with discrete electrical components or as one or more hardwired application specific integrated circuits (ASIC) that are custom designed for this purpose. Other programming languages may be used as desired.

The described implementation may include a particular network configuration but embodiments of the present disclosure may be implemented in a variety of data communication network environments using software, hardware, or a combination of hardware and software to provide the processing functions.

INDUSTRIAL APPLICABILITY

The disclosed asset management system may be applicable to any transportation network, including subways, trolleys, and railroads. The disclosed asset management system may increase efficiency in identifying, analyzing, and responding to operational statuses and issues that may arise in a network of trains. In particular, the disclosed asset management system may allow a user to easily identify one or more trains having assets that are experiencing fault conditions. The disclosed asset management system may also display graphical representations of the trains and/or assets experiencing fault conditions to allow the user to respond to the fault conditions in a quick and efficient manner. An exemplary operation of the disclosed asset management system will now be explained.

During operation of asset 16 associated with train 14 on railroad network 10, controller 68 may receive signal(s) from sensors 60 indicative of an operational status of asset 16 or its associated systems, subsystems, and/or components. For example, a signal provided by one of sensors 60 may be indicative that a component in a system has begun to deteriorate, lose integrity, or otherwise malfunction or has failed. In response to the signal from sensor 60, controller 68 may identify a fault code in the fault code table and retrieve diagnostic data associated with the fault code and asset 16 from database 88.

Referring to FIG. 4, controller 68 may then display this information on GUI 92 by way of user interface 66, 82, as described above. Specifically, controller 68 may display list 94 of selectable trains 14 associated with railroad network 10, list 96 of assets 16 associated with each train 14, and train summary area 98 providing summary information about a selected train 14. Controller 68 may also display alert area 106 to allow the user to view a list of selectable trains 14 and/or assets 16 that require attention. The user may select a train 14, asset 16, or both in order to view summary data of the train 14 and/or asset 16.

Controller 68 may display map 100 that allows the user to view the location of the selected and other trains 14 within a portion of railroad network 10. In some embodiments, the user may select trains 14 on map 100 in addition to selecting trains 14 via list 94 and alert area 106.

Upon selection of a train 14 and asset 16, controller 68 may populate asset system area 102 with one or more systems associated with the selected asset 16 and display a graphical representation 104 of the selected asset 16. The user may select a particular system from asset system area 102 to view the systems in conjunction with graphical representation 104. When the user selects button 108, controller may then display a plurality of graphical representations 104 of the selected asset 16, as shown in FIG. 5. Each of the plurality of graphical representations may include a visual indicator 110 of an associated asset system and/or symbols 111 resembling actual components of each respective system. Lists 94 and 96 as well as alert area 106 may also be displayed to allow the user to select other trains 14 and/or assets 16 in order to view a different set of systems, as desired.

Each visual indicator 110 may be indicative of the operational status of a respective system and/or its associated components. For example, each visual indicator may show each system and/or component in a certain color, each color corresponding to a different operational status (e.g., satisfactory, attention, failed). Controller 68 may display systems that require attention in system priority area 112 and display others or the remaining systems in another area, such as below system priority area 112. The user may select a system by selecting a graphical representation 104 via GUI 92 in order to view the system in isolation.

Based on the user's selection of a system, controller 68 may display visual indicator 110 of the system on graphical representation 104 in isolation, as shown in FIG. 6. In this way, the user may be able to visualize and quickly identify the type, location, and operational status of a compromised system, subsystem, and/or component associated with asset 16 and avoid undue downtime for diagnostic purposes.

Controller 68 may also display diagnostic area 114 via GUI 92. The user may select from one or more maintenance messages 116 listed in diagnostic area in order to change the system displayed by visual indicator 110 on graphical representation 104. In some embodiments, selection of a maintenance message 116 may also change which asset 16 is represented by graphical representation 104. Controller 68 may show diagnostic information (e.g., message date, type, description, status, etc.) to the operator via diagnostic area 114, thereby allowing the user to quickly assess and select issues needing addressed. Lists 94 and 96, as well as alert area 106, may also be displayed to allow the user to select other trains 14 and/or assets 16 in order to view a different asset and/or systems, as desired.

In some situations, controller 68 may display one or more maintenance messages 116 in quick task area 118 and/or active train area 120, as shown in FIG. 7. For example, when GUI 92 is associated with a portable or relatively smaller user interface 66, 82, controller 68 may display maintenance messages 116 to the user in a condensed format to allow the user to view diagnostic information according to a priority scheme (i.e., the highest priority information being displayed first). Controller 68 may display tasks, alerts, notifications, etc., relating to assets 16 of train 14 according to the priority scheme and allow the user to select the maintenance messages 116 in order to view additional information.

Upon selection of a maintenance message 116, controller 68 may display graphical representation 104 of asset 16 associated with the maintenance message, as shown in FIG. 8. Graphical representation 104 may include a visual indicator 110 of an asset system, subsystem, and/or components associated with the selected maintenance message. Controller 68 may also display asset view area 122 to allow the user to scroll or otherwise maneuver through one or more graphical representations 104 of assets 16 associated with train 14. For example, controller 68 may display each asset 16 associated with a maintenance message 116, fault code, or other diagnostic data to allow the user to identify quickly which assets 16 to address. Controller 68 may alternatively display every asset 16 associated with train 14 to allow the user to quickly view the operational status of each asset. In either case, controller 68 may show each graphical representation 104 in a relative or absolute order in which it actually appears in train 14. In this way, the user may be able to quickly identify which assets 16 require attention and where they are located throughout train 14.

The operator may select an asset from asset view area 122 to change the view of asset 16 in graphical representation 104. When the selected asset 16 is associated with a maintenance message 116, fault code, alarm, notification, or other data, controller may automatically configure visual indicator 110 to resemble the system, subsystem, and/or component associated with the data. After the user has viewed the information, the user may select a button to close the alarm or notification.

Several advantages may be realized by the implementation of the disclosed asset management system. By using the disclosed asset management system, a user may be quickly apprised of operational statuses, alarms, alerts, and other diagnostic data associated with machine assets as they become available during the operation of a machine system.

Further, the disclosed asset management system may allow the user to quickly visualize a plurality of assets and any associated systems, subsystems, and/or components that may be associated with diagnostic data. Additionally, the disclosed asset management system may allow the user to remotely view a machine or machine system in part or as a whole and determine quickly which assets, systems, subsystems, and/or components require attention. In this way, the disclosed asset management system may allow users to quickly identify and address issues associated with machine assets, thereby reducing operational delays and any economic penalties associated with the performance of diagnostic procedures.

It will be apparent to those skilled in the art that various modifications and variations can be made to the asset management system of the present disclosure. Other embodiments of the method and system will be apparent to those skilled in the art from consideration of the specification and practice of the asset management system disclosed herein. It is intended that the specification and examples be considered as exemplary only, with a true scope of the disclosure being indicated by the following claims and their equivalents.

What is claimed is:

1. An asset management system for a machine, comprising:
   a sensor associated with an asset of the machine and configured to generate a signal indicative of an operational status of a system associated with the asset;
   a user interface associated with the machine; and
   a controller in communication with the sensor and the user interface, wherein the controller is configured to:
   display on the user interface a graphical representation of the asset;
   receive via the user interface a user selection of the system from a plurality of systems associated with the asset;
   display on the graphical representation of the asset a visual indicator of the system in response to the user selection, wherein the visual indicator of the system is indicative of the operational status of the system; and
   display a graphical representation of the machine, wherein the graphical representation of the machine includes a visual indicator of each of a plurality of the assets in an order corresponding to an absolute order of the plurality of assets in the machine.

2. The asset management system of claim 1, wherein the visual indicator of the system includes one or more symbols of one or more components associated with the system.

3. The asset management system of claim 2, wherein each of the one or more symbols of the one or more components is indicative of an operational status of a respective one of the one or more components.

4. The asset management system of claim 3, wherein the operational status of each of the one or more components includes a satisfactory status, an attention status, or a failed status.

5. The asset management system of claim 4, wherein the satisfactory status, the attention status, and the failed status are each associated with a different respective color.

6. The asset management system of claim 1, wherein the controller is configured to display on the user interface a list of the plurality of systems associated with the asset, wherein each of the plurality of systems is selectable by a user from the list via the user interface.

7. The asset management system of claim 1, wherein the controller is configured to display on the user interface a plurality of graphical representations of the asset, each including a visual indicator of a respective one of the plurality of systems associated with the asset, wherein the visual indicator of the respective one of the plurality of systems is indicative of an operational status of the respective system.

8. The asset management system of claim 7, wherein each of the plurality of systems associated with the asset is selectable by a user from the plurality of graphical representations of the asset via the user interface.

9. The asset management system of claim 7, wherein the operational status of the respective one of the plurality of systems includes a satisfactory status, an attention status, or a failed status.

10. The asset management system of claim 9, wherein:
    the controller is further configured to determine when each of the plurality of systems is associated with an attention status or a failed status; and
    display a visual indicator of each of the plurality of systems associated with an attention status or a failed status on a respective one of the plurality of graphical representations of the asset.

11. An asset management system for a train having a plurality of train assets, comprising:
    a plurality of sensors, each being configured to generate a signal indicative of an operational status of a respective one of the plurality of train assets;
    a user interface associated with the train; and
    a controller in communication with the plurality of sensors and the user interface, wherein the controller is configured to:
    display on the user interface one or more maintenance messages, wherein each of the one or more maintenance messages is based on the signal generated by one of the plurality of sensors, the one or more maintenance messages includes a plurality of maintenance messages, each of the plurality of maintenance messages being associated with one of the plurality of train assets;
    receive via the user interface a user selection of one of the one or more maintenance messages, wherein the selected maintenance message is associated with one of the plurality of train assets;
    display on the user interface a graphical representation of the train asset associated with the selected maintenance message; and
    display a graphical representation of each of the plurality of train assets associated with one of the plurality of maintenance messages.

12. The asset management system of claim 11, wherein the selected maintenance message is associated with a system of the associated train asset.

13. The asset management system of claim 12, wherein the graphical representation of the train asset includes a visual indicator of the system associated with the selected maintenance message.

14. The asset management system of claim 13, wherein the visual indicator of the system associated with the selected maintenance message is indicative of an operational status of one or more components within the system.

15. The asset management system of claim 11, wherein the controller is configured to display the graphical representation of each of the plurality of train assets associated with one of the plurality of maintenance messages in an order corresponding to a relative order of the plurality of train assets in the train.

16. The asset management system of claim 11, wherein the controller is configured to display a graphical representation of the train, wherein the graphical representation of the train includes a visual indicator of each of the plurality of train assets in an order corresponding to an absolute order of the plurality of train assets in the train.

17. The asset management system of claim 16, wherein the visual indicator of each of the plurality of train assets is indicative of the operational status of a respective one of the plurality of train assets.

18. The asset management system of claim 17, wherein the graphical representation of the train is scrollable via the user interface.

* * * * *